United States Patent Office 3,764,344
Patented Oct. 9, 1973

3,764,344
DOUGH COMPOSITION FOR A CUP-SHAPED SHELL
Elmer F. Glabe, Chicago, Perry W. Anderson, Niles, and Stergios Laftsidis, Chicago, Ill., assignors to Food Technology, Inc., Chicago, Ill.
No Drawing. Filed Sept. 3, 1971, Ser. No. 177,861
Int. Cl. A23l 1/10, 1/12, 1/16
U.S. Cl. 426—138
3 Claims

ABSTRACT OF THE DISCLOSURE

A synergistic combination of durum wheat semolina or durum wheat semolina and potato peel flour, dehydrated mashed potato granules, potato starch and glycerin is mixed with water, the proportions of said ingredients being such as to produce an extrudable dough which will hold its shape. The dough is formed into a cup-shaped shell and water removed therefrom, e.g., by heating or baking. The cavity of said shell is then filled with mashed potatoes and the entire product is further heated or baked, thereby producing a simulated stuffed baked potato. Salt, milk, cheese, sour cream and other condiments can be added.

BACKGROUND

Baked potatoes are a commonly known and used item in not only the United States but in many parts of the world. It is common for food purveyors such as restaurants and airline companies to make what are known in the trade as "Stuffed Baked Potatoes." To prepare this product, potatoes are first washed and baked in an oven until the entire potato is thoroughly cooked, which is at the point when the starch is thoroughly gelatinized. The potatoes are then removed from the oven; the skin is then cut by making a lengthwise (to the potato) cut with a sharp knife. The potato is thus opened.

The interior portion of the potato is then removed with a spoon or other implement. The skin is handled carefully so as not to destroy its integrity. The interior portion of the potato is then mashed; salt, milk, cheese, sour cream and other condiments are commonly added at this point. This seasoned and flavored potato material is then replaced in the potato skin. Commonly, chives or parsley are then sprinkled on top of the stuffed baked potato. The product is then ready for serving.

The stuffed baked potato product is a popular item, but obviously it requires considerable hand labor. Additionally, food purveyors find that kitchen help commonly accidentally tear or otherwise partially destroy the potato skin during the process of removing the interior of the potato. This now leaves the food purveyor with a damaged skin or without a sufficient number of skins to make use of the potato material he has prepared. Under these circumstances, the food purveyors have replaced the damaged skin in aluminum foil, which acts as a support mechanism for the damaged skin. The seasoned and flavored interior portion of the potato is then placed into the skin inside of the aluminum foil.

Alternatively, the seasoned and flavored interior of the potato is merely placed in aluminum foil shaped in the form of a potato. Neither this method nor the serving of a partially destroyed potato skin gives the food purveyor a food product which he desires to serve in such fashion.

OBJECTS

One of the objects of this invention is to provide a composition and a process for preparing a simulated stuffed baked potato product whereby such product can be prepared rapidly in large quantities on an assembly line basis without the cumbersome procedures heretofore commonly employed.

Another object is to prepare a food product in the form of a shell which will hold its shape, is capable of receiving a filling such as mashed potatoes, can be heated or baked without losing its shape, can be cut into smaller pieces by the use of ordinary table utensils, if desired, after being heated or baked, and at the same time is palatable when eaten.

Another object of the invention is to provide a food shell of the type described which has a somewhat chewy texture simulating a baked potato skin.

A further object of the invention is to provide compositions of the type described and shells made therefrom which can be packed, shipped and stored without breakage.

Still another object of the invention is to provide a new and improved process for making simulated potato shells and a new and improved process for making simulated stuffed baked potato products. Other objects will appear hereinafter.

BRIEF SUMMARY OF THE INVENTION

In accordance with the invention it has been found that a composition can be prepared from durum wheat semolina or durum wheat semolina and potato peel flour, dehydrated mashed potato granules, potato starch, and glycerine in predetermined synergistic proportions, which can be mixed with water to make an extrudable dough and can be molded or extruded in the form of a cup-shaped shell which can be dehydrated and possesses enough elasticity along with rigidity in the dry state to be stored, packed and shipped without breakage. This shell will hold its shape and can be filled with mashed potatoes and baked to produce a simulated stuffed baked potato which is entirely edible.

DETAILED DESCRIPTION OF THE INVENTION

In the following description the molded or extruded shells are sometimes referred to as simulated potato skins. The components which are essential for the purpose of the invention are:

(A) durum wheat semolina in an amount within the range of 5% to 50% by weight or a part of the durum wheat semolina may be replaced with 5% to 35% by weight potato peel flour so that the total proportion of durum wheat semolina and potato peel flour is 5% to 50% by weight;
(B) dehydrated mashed potato granules in the amount of 5% to 50% by weight;
(C) potato starch in the amount of 2% to 5% by weight; and
(D) glycerin in the amount of 1% to 5% by weight.

The foregoing components (A), (B), (C) and (D) are mixed with water in an amount sufficient to make an extrudable dough which will hold its shape, the quantity of water required varying somewhat depending upon the relative proportions of the aforesaid components.

The dough prepared as previously described can be formed into a cup-shaped shell by extruding a dough sheet through a flat die, forming blanks from the dough sheet and molding the blanks to the desired shape or by extruding the dough through a special die which produces a cup-shaped shell. The cup-shaped shells are then dehydrated, preferably to a water content of 3% to 10% by weight by drying them or baking them, for example, in an oven or drying chamber operating at 325° F. to 375° F. for 15 to 20 minutes. The shells are then cooled and are ready for use in the preparation of a simulated stuffed baked potato.

The food purveyor or consumer prepares the simulated potato shells for use as follows. Dehydrated mashed potato granules are a relatively common item of commerce and are available from a number of sources. Various brands have been tested in the preparation method described herein with equal success. Briefly, the mashed potato granules are added in the proper proportion to a hot mixture of water, milk, salt, onion powder and pepper. The resulting mixture is stirred rapidly with a fork to make mashed potatoes. At this point, cheese or other condiments can be added.

This mixture is then placed in the dried simulated potato shells using a spoon or other implement. In restaurant kitchens, this may be done with a tube connected to a reservoir of mashed potatoes activated by compressed air. By this means, the shells can be rapidly filled.

The filled shells are then placed on metal baking pans or sheets; these are then placed in a baking oven at 375° F. for 10 minutes. Upon being removed from the oven, parsley flakes or chives may be sprinkled on the top. The simulated stuffed baked potatoes are then ready for serving.

It is to be noted that the entire product may be eaten. It will be found that the simulated potato skins have the texture of natural potato skins. Although they retain proper firmness and rigidity during the filling and rehydration process, they cut very easily with a fork. Because they are made from the elements of natural potatoes, they taste like natural potato skins.

The invention will be further illustrated but is not limited by the following examples in which the quantities are given in parts by weight unless otherwise indicated.

EXAMPLE I

| Ingredients | Grams | Percent |
|---|---|---|
| Durham wheat semolina | 250.0 | 11.22 |
| Dehydrated mashed potato granules (commercial) | 1,100.0 | 49.37 |
| Glycerin | 75.0 | 3.37 |
| Salt | 30.0 | 1.35 |
| Caramel color | 15.0 | 0.67 |
| Potato starch | 50.0 | 2.24 |
| Water | 700.0 | 31.42 |

The dry ingredients are first combined by blending thoroughly. The blend is then placed in the mixer of an extruder machine. Water is added and a dough is then formed. This dough is in the form of relatively dry crumbles. It is not a continuous or plastic dough. This is an essential feature of the process.

This wet mixture or dough is then placed in the extruder portion of the machine which consists of an auger operating in a closely confined tube, at the end of which is a die holder containing a die having a U-shaped extrusion orifice.

The dough extrudes from the die in a roughly U-shaped form. The sides of the U shape slant to the left and right rather than rising vertically. Upon emerging from the die, the dough tends to curl somewhat thereby assuming the general contours of one-half of a natural baked potato skin.

An automatically-operating knife blade which cuts against the surface of the die cut sections of the extruded dough. The size of these sections is determined by the operating speed of the knife blade. The resulting pieces of dough drop from the face of the die as roughly cup-shaped pieces approximately 3 to 3½" to length and approximately 2½ to 3" in width. The characteristics of the dough and the die permit the production of these cup-shaped pieces with very little additional handwork being necessary to make them into perfectly simulated potato skins.

These pieces have enough rigidity to permit their being placed on the wire drying or baking trays. The rigidity is also sufficient for the pieces to retain their shape during the first few minutes of the heating step. Obviously, as the heating progresses, the simulated shells are dried thereby permitting them to retain their shape throughout the drying step.

Some variation in formula is possible, but only in those ingredients which do not materially affect elasticity and texture of the dough itself. Thus, salt and caramel color will have no effect on the texture but affect flavor only. Potato starch and semolina, on the other hand, are very important ingredients in the formation of the proper texture of the sheet during extrusion.

The function of the potato granules is to provide a crisp and dry texture to the simulated shells after they have been dried or baked, and a soft, yet slightly crisp texture to the shell after it has been prepared for eating by the second baking step after the mashed potato granules have been placed therein.

Glycerin has been found to exert a plasticizing effect on the extruding dough.

Semolina is one of the major texture-building ingredients. Potato starch is necessary as an adjunct to semolina to give the dough its form-holding characteristics. Potato granules alone cannot supply the required elasticity.

The color of the finished simulated potato shells is affected by the quantity of caramel color which is used. Caramel color is burnt sugar and is a common item of food manufacturing operations. Increasing the caramel color makes the product darker.

The process of making simulated potato skins can also be operated by extruding the dough as a sheet using a die commonly employed for such purposes on a macaroni press. The sheet is then cut into sections approximately 4" x 4". These sections are then laid onto a mold shaped as the half of one potato. The mold can be made from various materials—plaster of Paris, special plastics, or metal. The mold consists of both a male and female part. The extruded sheet of dough is placed over the male section of the die. The female section is then lowered onto this sheet pressing it into the shape of the potato mold. The mold is then opened and the formed potato skin is carefully removed and placed on a wire screen. It is then baked or dried in an oven similar to the procedure used in Example I hereof.

This procedure has the advantage of producing simulated potato skins which have an appearance even closer to that of natural potato skins with respect to contour and the presence of "eyes." However, this process requires extreme care in formulation in order to permit proper extrusion of the sheet and, more important, formation of the skin and its removal from the mold. The latter step requires considerable care so that the shape of the potato skin is not modified during the removal.

It has also been folnd that in order to hold the potato shape during the drying and baking, that a sheet of aluminum foil pressed in the mold simultaneously with the extruded sheet of dough provides a means of support during the drying and baking step. In effect, the aluminum foil is a mold in itself, preserving the shape until the dryness of the skin is such to preserve its rigidity.

The use of the aluminum foil enters a cost factor in the production and therefore this procedure has this cost disadvantage, in comparison to the single-step operation indicated under Example I.

The following examples illustrate compositions which can be used in formulating the simulated potato skins using the two-step process.

| | Percent | |
|---|---|---|
| Example | II | III |
| Ingredients: | | |
| Durum semolina | 32.41 | 13.80 |
| Potato peel flour | 17.93 | 17.93 |
| Potato granules | 13.80 | 32.41 |
| Salt | 1.38 | 1.38 |
| Glycerin | 3.45 | 3.45 |
| Water | 31.03 | 31.03 |

Examples II and III show the possibility for variation and range in the quantity of semolina versus the potato granules. The potato peel flour is held at a constant level in this formula in order to provide the best texture and color and eating characteristics.

The process for making simulated potato skins can also be operated on a two-step process in which the dough is extruded as a sheet through a sheeting die. Sections of the sheet approximately 4" x 4" are then cut from this larger sheet. These sheets are then molded into the shape of a half potato using a mold made from plaster of paris but operated by hand. The mold, as in the previous two-step process, consists of both male and female sections. The forming is similar to the process used in the plastics molding machine described in the previous two-step process.

The following examples were carried out with the two-step process using hand molds.

| Example | Percent | | | |
|---|---|---|---|---|
| | IV | V | VI | VII |
| Ingredients: | | | | |
| Semolina | 31.72 | 17.93 | 32.12 | 30.35 |
| Potato peel flour | 32.42 | 32.42 | 17.93 | 17.24 |
| Potato granules | | 13.79 | 13.79 | 13.10 |
| Salt | 1.38 | 1.38 | 1.38 | 1.38 |
| Glycerin | 3.45 | 3.45 | 3.45 | 3.45 |
| Water | 31.03 | 31.03 | 31.03 | 31.03 |
| Shortening | | | | 3.45 |

Example IV, which is high in potato peel flour, was workable but finished product is bitter-tasting, indicating that too much of this ingredient was used. Example V produced skins which have less bitterness but the lowering of the semolina content reduced the elasticity, thereby producing difficulty in sheeting.

In Example VI, elasticity and taste were very good and therefore this formula must be considered the ideal in this two-step process method.

Example VII was tried to demonstrate the desirability of using shortening or fatty substances to introduce extra tenderness of texture. The presence of the shortening was found to destroy the elasticity of the dough almost completely. Extrusion was very difficult, to almost impossible, and formation of the potato skin in the molds was quite impossible.

Example VII demonstrates that glycerin is a specific plasticizer for this formula and as such is essential and cannot be replaced with vegetable fats which normally are considered to have plasticizing effects on simple flour doughs.

In the foregoing examples, the thickness of the shell averaged around 1/32 inch. The thickness can vary but if the shell is too thin it will tear and if it is too thick it will make the final simulated stuffed potato less suitable for eating. The thickness of the final shell is normally within the range of 1/64 inch to 1/16 inch.

While it is normally desirable to use an elongated shell simulating an elongated potato skin, the shape can be round or any other suitable cross section. The depth of the shell cavity can also be varied widely.

Example I gives the ideal in both formula and extruding and forming procedures. Other examples show some variations which can be made in the formula. For example, some of the potato granules can be replaced with potato peel flour. The latter item of commerce is the result of the collection and dehydration and milling of potato peels or skins which are produced as a by-product in the manufacture of potato chips and other types of fat-fried potatoes. The potato skins are generally abraded from the potato and are collected from the processing water or solution by various means, among which is screening and centrifuging. These potato skin particles are then dewatered and finally dried by spray drying or tray drying. The particles are then milled to flour fineness.

In the process for making simulated potato skins, the potato skin flour can be used in place of some of the potato granules. It is not feasible to replace the semolina with potato peel flour. Loss of texture rigidity during drying and crispness of the final product during baking are a result of reducing the semolina too far.

From the foregoing description it will be recognized that some variations can be made in the composition within the scope of the invention and some of these variations will depend upon whether the dough product is extruded in a single step or in a two-step process involving extrusion plus forming on a separate machine or in a two-step process using hand molds.

While the proportions of semolina can be varied over the range of 5% to 50% of the formula with the potato granules being varied in quantity accordingly, when high levels of semolina are used the potato shells hold their shape very well but the taste and texture when prepared for eating are less appealing. Conversely, when semolina is at the lower range and the potato granules at the higher range, taste and texture are good but shape is sacrificed to a degree.

At the lower levels of glycerin, around 1%, proper plasticizing becomes less apparent. At ranges above 5% no additional plasticizing is obtained but at quantities as high as 10% other deleterious effects are noticed. Inasmuch as there is no advantage to using more glycerin than 5%, this becomes a practical maximum.

At the lower levels in the range of 2% to 5% the potato starch contributes to the elasticity of the dough during forming but this ingredient can be varied alternatively to the semolina. At levels of 5% a rough texture is obtained on the shells.

The actual quantity of water used will vary according to the ingredients employed and their levels. Doughs made with higher potato granule content absorb more water than doughs with higher semolina or potato starch content. Doughs made with high moisture levels will give difficulty in extruding and will not produce rigid skins which hold their shape during the drying and baking step.

Conversely, doughs made with low water levels produce a sheet which tends to be difficult to extrude properly, since the sheet tears or breaks under these conditions. The range of water level is 30.0% to 50.0%.

An artificial potato flavor can be added as an optional ingredient to improve the flavor of the finished shells. The quantity varies with the type of artificial flavor used. One type was found to be satisfactory at a use level of 0.36% with the semolina being correspondingly reduced in this amount when the potato flavor was used.

While the range of potato peel flour can be from 5% to 35%, the optimum level is 25% with the semolina quantity balancing the amount of potato peel flour. Of course, as shown by Example I the potato peel flour can be omitted entirely and if the shells are formed by extruding a sheet as in Examples II and III, the level should not exceed 25%.

The shell which simulates a potato skin possesses sufficient firmness and rigidity to permit manipulation in the kitchens of a food purveyor or a restaurant. After having been filled with seasoned and flavored potato material made from dehydrated mashed potato granules, and after having been baked in the oven for a very short period of time, the simulated potato skins rehydrate and take on the texture, appearance, and taste of the natural skins.

The advantages of using the simulated potato skin product are obvious. No previous preparation is required for the food purveyor to perform other than the simple step of making the entire product ready for serving, which can be done in only a few minutes time, compared to a long baking period of an hour or more for natural baked potatoes.

The simulated potato skins store very well and can be kept for many months until required for use. They also possess enough elasticity along with rigidity when they are in the dry state to permit them to be packed and shipped with a minimum of breakage.

Throughout the specification and claims the following definitions apply:

"Durum wheat semolina" means granular particles of the endosperm or heart of durum wheat which is usually 30–40 mesh size (U.S. Standard Sieve Series). The endosperm is the part remaining after removing the outer coating or bran portion of the wheat.

"Dehydrated mashed potato granules" are granular particles of the entire endosperm of the potato including protein, starch, fiber and minerals.

"Potato starch" is the starchy part of the potato endosperm from which protein, fiber and minerals have been removed.

The invention is hereby claimed as follows:

1. An extrudable composition for preparing a cup-shaped shell adapted to be filled with mashed potatoes and baked to simulate a stuffed baked potato consisting essentially of:

| Ingredients: | Percent by weight |
|---|---|
| (A) A substance from the group consisting of durum wheat semolina and 45% to 15% durum wheat semolina mixed with 5% to 35% potato peel flour | 5–50 |
| (B) Dehydrated mashed potato granules | 5–50 |
| (C) Potato starch | 2–5 |
| (D) Glycerin | 1–5 | the proportions of said ingredients being such that said composition when mixed with sufficient water will form a dough which can be extruded and shaped to a cup-shaped shell that will hold its shape when dried and baked and will retain its shape when filled with mashed potatoes and baked.

2. A composition as claimed in claim 1 in which A is durum wheat semolina.

3. A composition as claimed in claim 1 in which (A) is 45% to 15% durum wheat semolina and 5% to 35% by weight potato peel flour.

References Cited
UNITED STATES PATENTS

| | | | |
|---|---|---|---|
| 2,437,150 | 3/1948 | Berg | 99—83 |
| 3,027,258 | 3/1962 | Markakis | 99—207 |
| 3,057,732 | 10/1962 | Conrad | 99—100 P |
| 3,089,773 | 5/1963 | Bates | 99—207 |
| 3,259,503 | 7/1966 | Tan | 99—83 |
| 3,282,701 | 11/1966 | Wong | 99—100 P |
| 3,361,573 | 1/1968 | Reinertzen | 99—83 |

NORMAN YUDKOFF, Primary Examiner

M. G. MULLEN, Assistant Examiner

U.S. Cl. X.R.

426—158